(12) United States Patent
Wolfe

(10) Patent No.: US 11,497,217 B2
(45) Date of Patent: Nov. 15, 2022

(54) AIR IMPINGEMENT CONVEYOR OVEN

(71) Applicant: Wolfe Electric, Inc., Wichita, KS (US)

(72) Inventor: Ronald D. Wolfe, Wichita, KS (US)

(73) Assignee: Wolfe Electric, Inc., Wichita, KS (US)

( * ) Notice: Subject to any disclaimer, the term of this patent is extended or adjusted under 35 U.S.C. 154(b) by 415 days.

(21) Appl. No.: 16/564,974

(22) Filed: Sep. 9, 2019

(65) Prior Publication Data

US 2019/0387751 A1 Dec. 26, 2019

(51) Int. Cl.
*A21B 1/24* (2006.01)
*F24C 15/32* (2006.01)
*F24C 7/08* (2006.01)
*A21B 1/26* (2006.01)
*A21B 1/48* (2006.01)
*A21B 3/02* (2006.01)

(52) U.S. Cl.
CPC ............... *A21B 1/245* (2013.01); *A21B 1/26* (2013.01); *A21B 1/48* (2013.01); *A21B 3/02* (2013.01); *F24C 7/087* (2013.01); *F24C 15/325* (2013.01)

(58) Field of Classification Search
CPC .. A21B 1/245; A21B 1/26; A21B 1/48; A21B 3/02; F24C 7/087; F24C 15/325; F27B 9/10
See application file for complete search history.

(56) References Cited

U.S. PATENT DOCUMENTS

| | | | |
|---|---|---|---|
| 2,220,718 A | 11/1940 | Holm | |
| 2,249,152 A | 7/1941 | Marshall | |
| 2,256,003 A | 9/1941 | Patterson | |
| 2,286,049 A | 6/1942 | Baker | |
| 2,634,693 A | 4/1953 | Pointon | |
| 3,239,651 A | 3/1966 | Silberman | |
| 3,485,229 A | 12/1969 | Gilliom | |
| 3,526,752 A | 9/1970 | Bell | |
| 4,377,109 A | 3/1983 | Brown et al. | |
| 4,471,000 A | 9/1984 | Brown et al. | |
| 4,753,215 A | 6/1988 | Kaminski et al. | |
| 4,834,063 A | 5/1989 | Hwang et al. | |
| 4,940,040 A | 7/1990 | Randall et al. | |
| 4,960,100 A | 10/1990 | Pellicane | |
| 5,131,841 A * | 7/1992 | Smith | A21B 1/245 432/152 |
| 5,180,898 A | 1/1993 | Alden et al. | |

(Continued)

FOREIGN PATENT DOCUMENTS

WO WO8900393 1/1989

*Primary Examiner* — Joel M Attey
*Assistant Examiner* — Franklin Jefferson Wang
(74) *Attorney, Agent, or Firm* — Kenneth H. Jack; Davis & Jack, LLC

(57) ABSTRACT

An air impingement conveyor oven incorporating a case having orthogonal walls, the case being opened by opposite end food passage ports; an air plenum mounted within the case; vertical pairs of forwardly extending finger ducts mounted to the plenum; a food conveyor extending between the finger ducts pairs and through the food passage ports; register plates having air jet matrixes, the register plates covering the finger ducts; and the matrixes air jets upon the register plates, the air jets being configured for air flow direction biasing both toward the rearward ends of the food passage ports and away from the forward ends of the food passage ports.

4 Claims, 9 Drawing Sheets

(56) References Cited

U.S. PATENT DOCUMENTS

| | | | |
|---|---|---|---|
| 5,205,274 A | 4/1993 | Smith et al. | |
| 5,285,771 A | 2/1994 | Griffes | |
| 5,432,248 A | 7/1995 | Bonfanti et al. | |
| 5,532,456 A | 7/1996 | Smith et al. | |
| 5,673,681 A | 10/1997 | Neitzel et al. | |
| 5,683,240 A | 11/1997 | Smith et al. | |
| 5,942,142 A | 8/1999 | Forney et al. | |
| 5,944,515 A | 8/1999 | Gilmore et al. | |
| 6,121,582 A | 9/2000 | Dollinger et al. | |
| 6,192,877 B1 | 2/2001 | Moshonas et al. | |
| 6,251,006 B1 | 6/2001 | Laborde et al. | |
| 6,320,165 B1 | 11/2001 | Ovadia | |
| 6,576,874 B2 | 6/2003 | Zapata et al. | |
| 6,686,566 B1 | 2/2004 | Corey | |
| 6,833,533 B1 * | 12/2004 | Wolfe | A21B 1/245 219/400 |
| 7,098,432 B2 | 8/2006 | Rew et al. | |
| 7,220,946 B2 | 5/2007 | Majchrzak et al. | |
| 7,340,992 B1 | 3/2008 | Wolfe et al. | |
| 7,604,000 B2 | 10/2009 | Wolfe et al. | |
| 2005/0139203 A1 * | 6/2005 | Jones | A21B 1/245 126/21 A |
| 2011/0139140 A1 * | 6/2011 | Baker | A21B 1/245 126/1 AD |
| 2013/0175253 A1 * | 7/2013 | Shei | A47J 39/003 219/400 |
| 2020/0060290 A1 * | 2/2020 | Schjerven | A21B 1/48 |

* cited by examiner

AIR IMPINGEMENT CONVEYOR OVEN

FIELD OF THE INVENTION

This invention relates to commercial air impingement conveyor ovens. More particularly, this invention relates to such ovens which include structural modifications for controlling air flows at the oven's food passage ports.

BACKGROUND OF THE INVENTION

Air impingement conveyor ovens commonly comprise a box configured baking case having insulated walls consisting of a ceiling, a floor, a front wall or panel, a rear wall, and longitudinal and oppositely longitudinal end walls. An air plenum and finger ducts combination air handling structure is commonly mounted within the baking case, the air plenum component being positioned rearwardly. Vertically paired finger ducts commonly extend forwardly from the plenum.

A rearward wall of the air plenum commonly presents a large impingement air intake port, and a forward wall of the air plenum often presents multiple impingement air outlet ports. Each such outlet port communicates with and supports a proximal end of one of the finger ducts. An air blower mounted rearwardly within the baking case is typically situated to propel impingement air into and through the air plenum, and into the vertically paired finger ducts. Such ducts typically present downwardly and upwardly facing register plates which incorporate downwardly and upwardly opening impingement air jetting ports or nozzles.

A cooking grate-type continuous loop food conveyor commonly extends in the longitudinal/oppositely longitudinal direction within the interior of the baking case, such conveyor passing between the vertically paired finger ducts. The baking case is preferably opened at its longitudinal and oppositely longitudinal walls by longitudinal and oppositely longitudinal food passage ports, such ports being rectangular and oblongated in the front/rear or lateral direction to provide a clearance width sufficient to receive the longitudinal and oppositely longitudinal ends of the food conveyor. Such air impingement conveyor ovens typically incorporate a gas fired heater or an electric resistance heater for maintaining air temperatures within the baking case at food levels in the range of 375°–500° F. The incorporation of the above described air blower and heater within an air impingement conveyor oven often gives rise to cooking inefficiencies resulting from exchanges of interior and exterior air at the sites of the oven's longitudinal and oppositely longitudinal food passage ports. Heated air within the baking case is relatively buoyant with respect to the ambient room temperature air surrounding the oven, the buoyancy producing convective flows of heated cooking air out of the oven's longitudinal and oppositely longitudinal food passage ports. Operation of the air blower at the rear of the oven's interior exacerbates such convective emissions of heated air by creating a lateral pressure differential within the oven wherein air pressure at the front of the oven is higher than air pressure at the rear of the oven. Such air pressure differential often results in an aspirating or inward flow of room temperature air which is located at the rearward ends of the food passage ports. Such undesirable air aspiration occurs while high pressure at the forward ends of the food passage ports exacerbates the above described convective losses of heated cooking air.

Losses of heated cooking air at the forward ends of the oven's longitudinal and oppositely longitudinal food passage ports through the combined effects of heat convection and pressure differential reduce the efficiency and performance of the oven, undesirably requiring additional heating energy to maintain a desired cooking temperature. Pressure differential induced aspiration of room temperature air at the rearward ends of the food passage ports further reduces the efficiency of the oven.

The instant inventive air impingement conveyor oven solves or ameliorates the above described air flow related heating energy problems and deficits of common air impingement conveyor ovens by specially configuring the air jets presented at the oven's longitudinal and/or oppositely longitudinal ends to direct counter-flows of air which oppose outward and inwardly direct flows of air at the rearward and forward ends of at least one of, and preferably both of the oven's food passage ports.

BRIEF SUMMARY OF THE INVENTION

A first structural component of the instant inventive air impingement conveyor oven comprises a baking case having walls including an upper ceiling, a lower floor, and a forward or front wall, a rear wall, the oven further having ported longitudinal and oppositely longitudinal walls. In the preferred embodiment, all of the walls of the oven's case are metal-clad and include interior heat insulation. The front wall of the baking case preferably is configured as a removable access panel, and the ports of the case's longitudinal and oppositely longitudinal walls or end walls are preferably rectangular, and are laterally oblongated for food item passages.

The oblongations of the oven's food passage preferably provide a width sufficient to receive a grate-type continuous loop food conveyor, and the vertical heights of such ports are preferably sufficient to accommodate the vertical height or top to bottom dimension of both the food conveyor and the height of food items which are carried by the conveyor.

A further structural component of the instant inventive air impingement conveyor oven comprises a box configured air plenum which is mounted within the baking case at its rearward end. In a preferred embodiment, a rearward wall of the air plenum presents a large impingement air intake port for receipt of impingement air from an internally mounted air blower. In a suitable embodiment, the oven's air blower may comprise an electric motor driven fan which is mounted concentrically within the plenum's air intake port.

Further structural components of the instant inventive air impingement conveyor oven comprise an array of finger ducts which extend forwardly from the air plenum. Such ducts are suitably arranged to include a longitudinal-most vertical pair of finger ducts, an oppositely longitudinal-most vertical pair of finger ducts, and at least one longitudinally intermediate vertical pair of finger ducts. In the preferred embodiment, each finger duct has a rearward or proximal end and a forward or distal end, such rearward ends being attached in communication with multiple outlet ports which open a forward wall of the plenum.

A further structural component of the instant inventive oven comprises an electric motor driven continuous loop food conveyor, such conveyor preferably being of the continuous loop grate type.

The oven's food conveyor component preferably extends longitudinally through the interior of the baking case at an elevation between the oven's vertically paired upper and lower finger ducts. A longitudinal end of the food conveyor preferably protrudes longitudinally from the oven's longitudinal food passage port and, correspondingly, the conveyor's oppositely longitudinal end protrudes oppositely longitudinally from the oven's oppositely longitudinal food passage port.

In the preferred embodiment of the instant invention, the vertically paired finger ducts overlie and underlie the food conveyor, such ducts respectively opening downwardly toward the food conveyor and upwardly toward the food conveyor. Register plates preferably cover such openings, and matrixes of air impingement jets are preferably supported upon or are wholly or integrally formed as a part of the register plates. The jet matrixes open the intermediate finger ducts for directing and jetting flows of impingement air downwardly and upwardly toward food items carried through the baking case by the food conveyor.

Further structural components of the instant inventive air impingement conveyor oven comprise air flow direction biasing means which operatively configure the impingement air jet matrixes at the longitudinal and/or oppositely longitudinal ends of the oven for directing flows of air toward at least one of the food passage ports' rearward ends, and preferably both ports' rearward ends, and for simultaneously directing separate flows of air away from the forward end of the at least one food passage port, and preferably both.

In operation of the instant inventive air impingement conveyor oven, heated air within the oven provided by an integral air heater or furnace (such as a gas burner or an electric resistant heater) becomes buoyant in relation to outside ambient air. Portions of the buoyant heated air at the longitudinal and oppositely longitudinal ends of the case undesirably convectively emit from the food passage ports, producing an outward draw of heated air therefrom. The operation of the oven's internal air blower simultaneously induces an air pressure differential within the interior of the case wherein a relatively high pressure zone resides at the forward end of the baking case, and a relatively low pressure zone resides at the rearward end of the baking case. Such air pressure differential is often extreme, resulting in aspirating flows of ambient room temperature air into the baking case at the rearward ends of the longitudinal and oppositely longitudinal food passage ports. Such air pressure differential simultaneously exacerbates the convective losses of heated cooking air which occur at the forward ends of the food ports. The invention's air flow direction biasing configurations of its impingement air jet matrixes advantageously directs flows of air inwardly toward the oven's midline at the outer end of at least one of, and preferably both of the oven's food ports, and simultaneously oppositely jets air outwardly away from the oven's midline at the at least one food port's inner end, or both ports' inner ends. Accordingly, the instant invention advantageously promotes and effects inward and outward flows of air which resist and nullify undesirable outward and inward air flows which are produced by the above described heating convection and air pressure differential effects.

Accordingly, objects of the instant inventive include the provision of an air impingement conveyor oven which incorporates structures as described above, and which arranges those structures in relation to each other in manners described above for the achievement and performance of beneficial functions as described above.

Other and further objects, benefits, and advantages of the instant invention will become known to those skilled in the art upon review of the Detailed Description which follows, and upon review of the appended drawings.

DETAILED DESCRIPTION OF PREFERRED EMBODIMENTS

Figure 1:
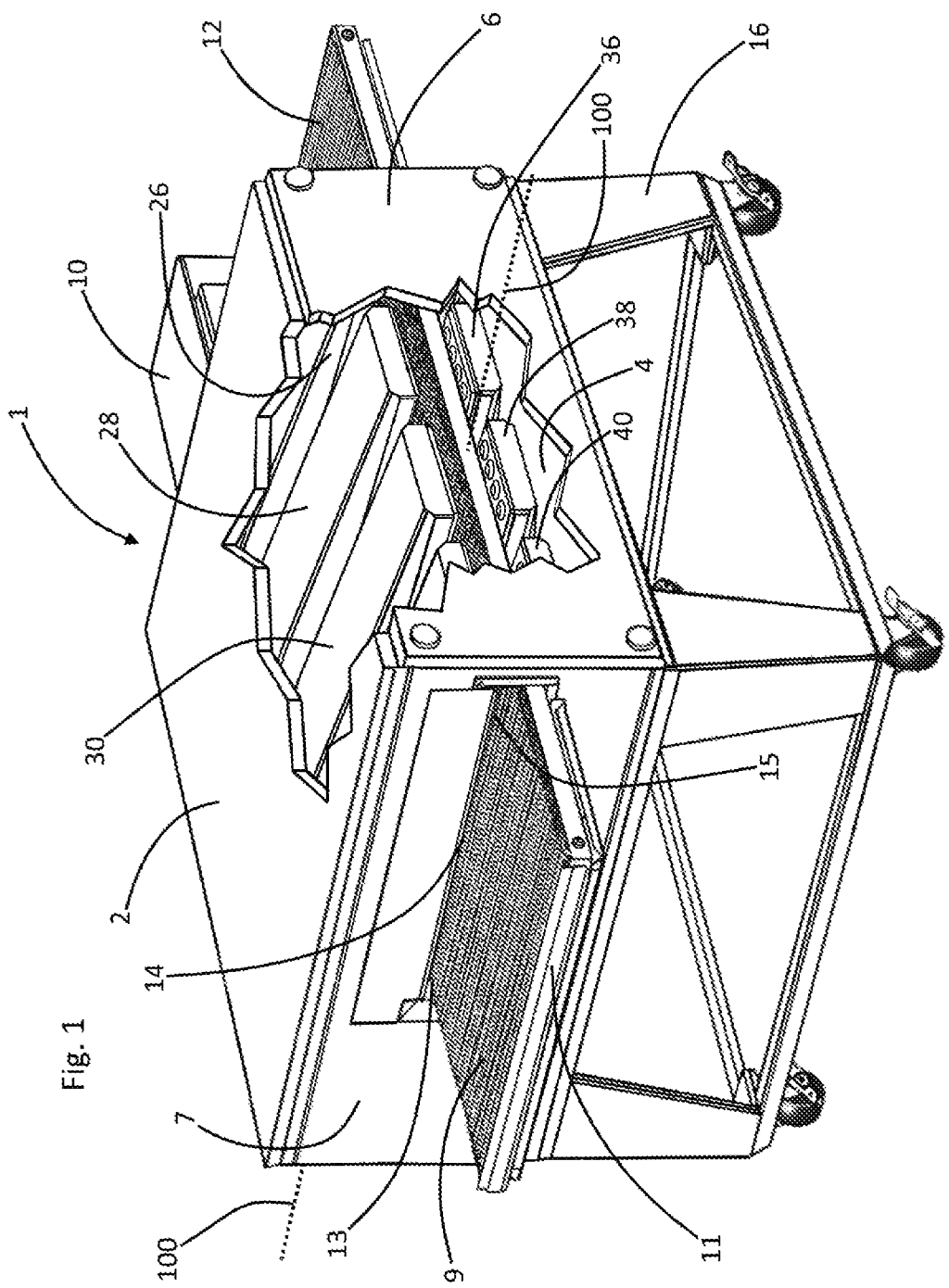
FIG. 1 is a perspective view of a preferred embodiment of the instant inventive air impingement conveyor oven, the oven including a "cutaway" portion exposing interior structures.

Referring now to the drawings and in particular to Drawing FIG. 1, a preferred embodiment of the instant inventive air impingement conveyor oven is referred to generally by Reference Arrow 1. The oven 1 has an upper wall or ceiling 2 and has a floor 4 underlying the upper wall 2. A front wall 6, which is preferably configured as a removable panel, covers a forward access opening of the oven's case. A fixed rear wall (not depicted within views) closes the case's rearward end.

A longitudinal wall 7 covers and closes the longitudinal end of the baking case, and a similarly configured or mirroringly configured wall (not depicted within views) covers the oppositely longitudinal end of the oven's baking case. A rectangularly configured longitudinal food passage port 14 opens the baking case at the longitudinal wall 7, such port having rear and front ends 13 and 15, and being oblongated in the lateral or front to rear direction. A mirroringly configured oppositely longitudinal food passage port (not depicted within views) similarly opens the baking case at its oppositely longitudinal end.

A control housing 10 is preferably mounted to the baking case's oppositely longitudinal wall, such housing suitably encasing and supporting a gas burner and an electric conveyor driving motor (not depicted within views). Alternatively, the oven 1 may be heated by electric resistance elements. A roller stand 16 may be provided for floor support of the baking case.

Figure 2:
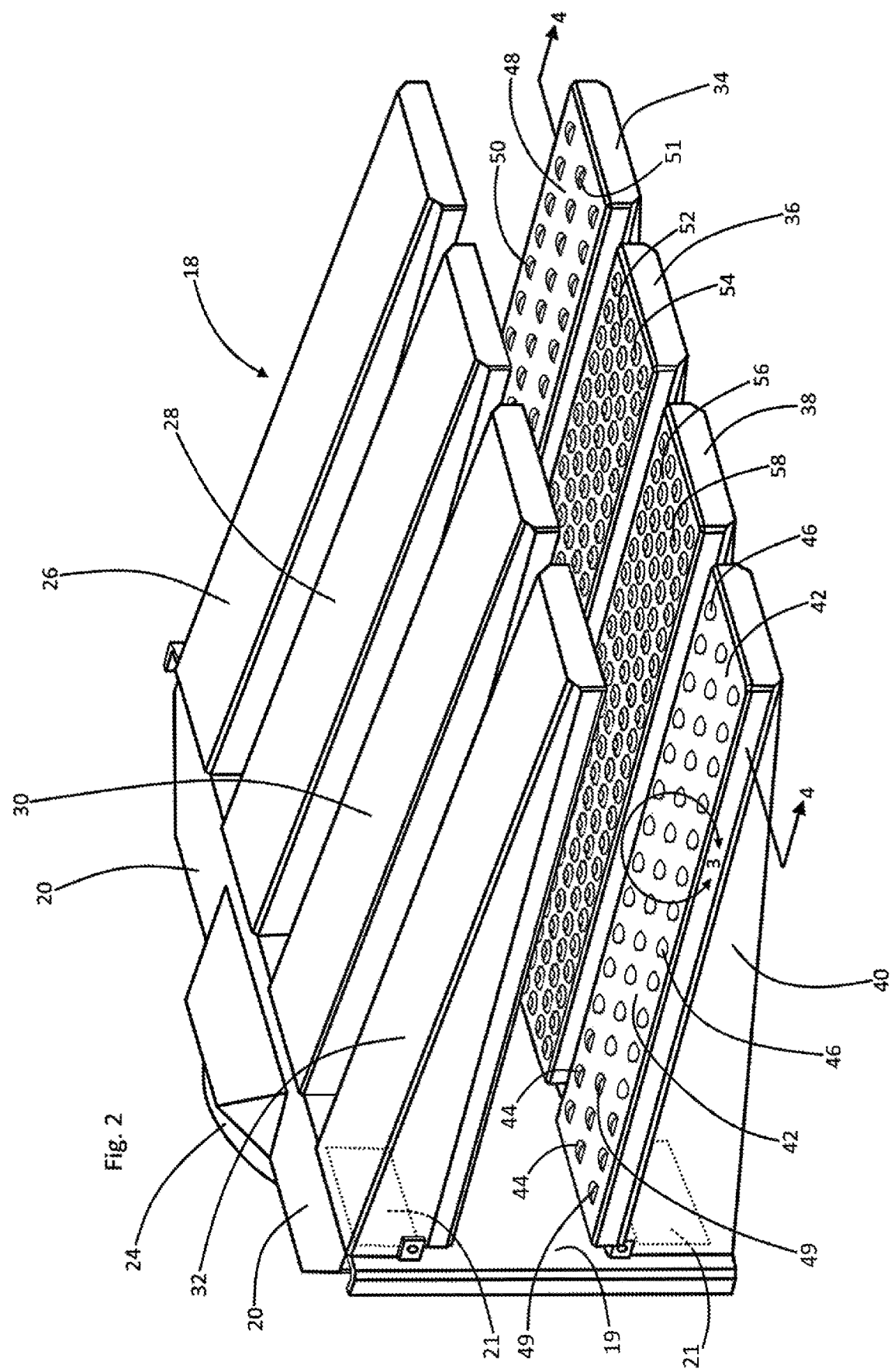
FIG. 2 is a perspective view of a finger duct and plenum combination component of the FIG. 1 structure, the view showing such combination removed from the structure of FIG. 1.
Figure 3:
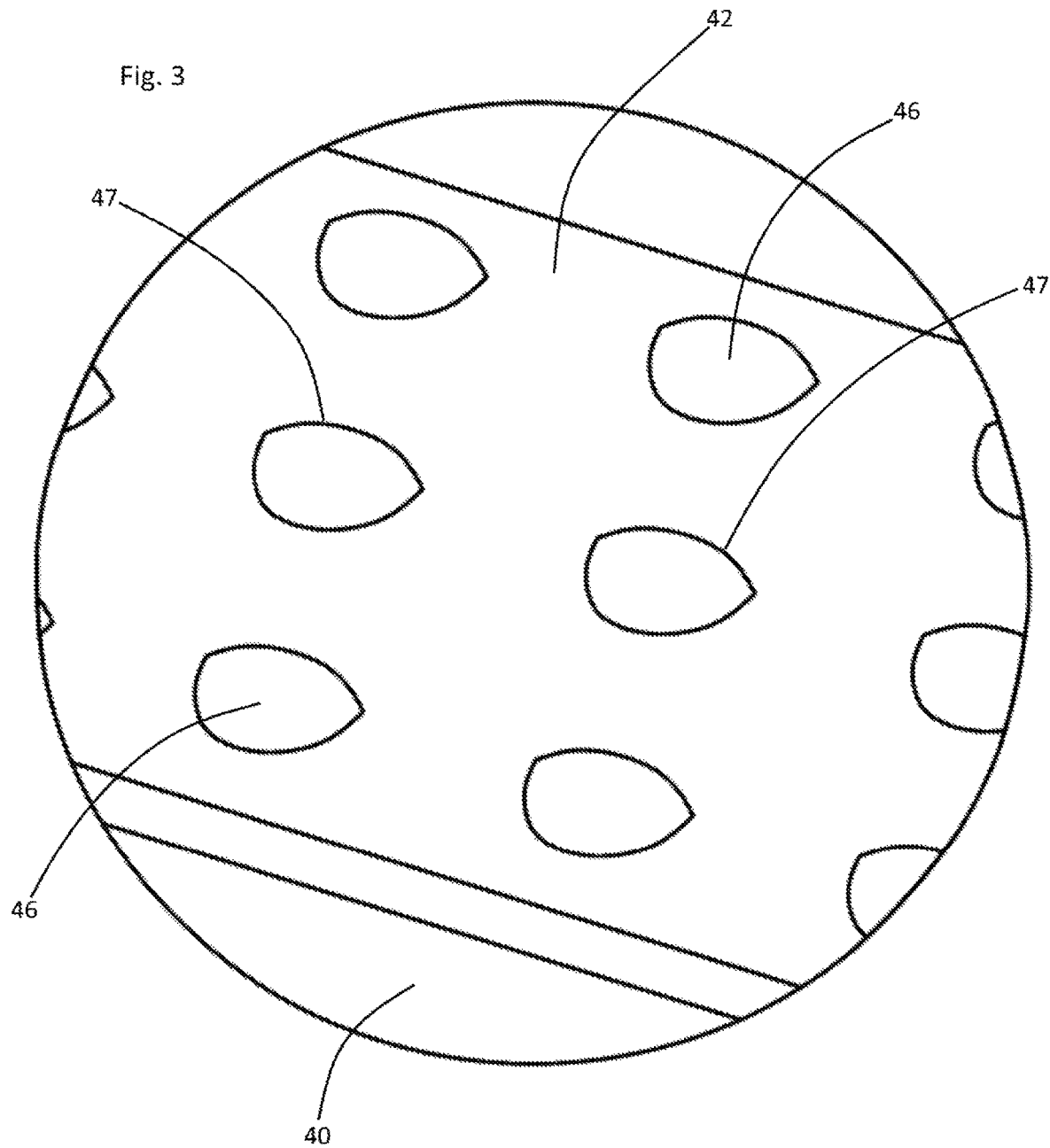
FIG. 3 is a magnified view of a portion of the structure of FIG. 2 as indicated in FIG. 2.
Figure 4:
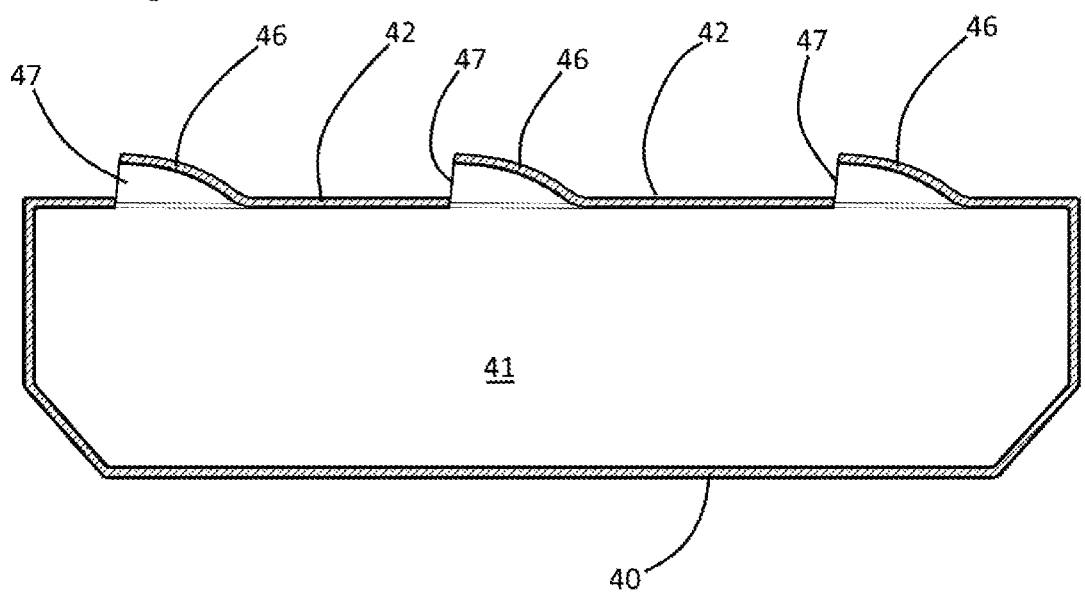
FIG. 4 is a partial sectional view of the structure of FIG. 2 as indicated in FIG. 2.

Referring simultaneously to FIGS. 1 and 2, a hollow air plenum 20 having a rearwardly positioned air intake port 24, is mounted within the interior of the baking case. An electric motor and fan combination (not depicted within views) is suitably mounted within the interior of the baking case, such motor and fan being situated and positioned for impelling impingement air through port 24 and into the plenum 20.

The air plenum 20 has a forward wall 19 which is opened by multiple finger duct outlet ports 21 shown in dashed lines. An array of finger ducts is mounted to the plenum 20 so that a rearward or proximal end of each the finger duct communicates with one of the outlet ports 21. In a preferred embodiment, the array of finger ducts comprises a longitudinal-most vertical pair of finger ducts 32,40, an oppositely longitudinal-most vertical pair of finger ducts 26,34, and at least a first, and preferably a plurality of intermediate vertical pairs of finger ducts 30,38 and 28,36. Each of the upwardly oriented ducts among the vertical finger duct pairs opens downwardly and, correspondingly, each of the duct pairs' downwardly oriented ducts opens upwardly. A grate type continuous loop food conveyor 9 preferably extends in the longitudinal/oppositely longitudinal direction through the interior of the baking case, such conveyor 9 residing at an elevation between the vertically paired finger ducts as indicated in FIG. 1. The longitudinal end 11 of the food conveyor 9 preferably communicates with and protrudes from the longitudinal food passage port 14, and the conveyor's oppositely longitudinal end 12 similarly protrudes oppositely longitudinally from the oven's oppositely longitudinal food passage port.

Register plates 42, 56, 52, and 48, respectively cover and close the upwardly facing output ends of lower finger ducts 40, 38, 36, and 34, while the overlying and mirroringly configured register plates (not depicted within views) cover and close the downward outputs of finger ducts 32, 30, 28, and 26. Such upwardly facing and downwardly facing register plates present at least a first, and preferably a plurality of impingement air jet matrixes represented by matrixes 44, 46, 50, 54, and 58. The air jet matrixes presented upon the finger ducts' overlying register plates (not depicted within views) are preferably vertically mirroringly configured. In the preferred embodiment, the oven's intermediate air jet matrixes 54 and 58 open the intermediate finger ducts 38 and 35 for vertically directing impingement air conveyed therein upwardly or downwardly toward food items carried upon conveyor 9.

Referring simultaneously to FIGS. 1-4, air flow direction biasing means are operatively incorporated into air jet matrix 44,46, such matrix comprising louvered ports which are formed integrally or wholly with register plate 42.

The air jet matrix 44,46 is an at least first matrix which is representative of additional matrixes which are preferably incorporated within the inventive oven, such at least first matrix preferably comprising a proximal air jet submatrix 44 and a distal air jet submatrix 46. Each air jet among such distal air jet submatrix 46 preferably has an outlet or opening 47 which faces away from port 14 and toward the oven's lateral midline 100. Moving proximally along duct 40, louvered openings 49 of the proximal air jet submatrix 44 oppositely face away from midline 100 and toward port 14. The 180° opposite orientations of openings 47 and 49 functionally reduce aspirations and emissions of ambient air and heated air at opposite ends of port 14.

In operation of the instant inventive air impingement conveyor oven 1, heated cooking air undesirably tends to emit from the forward or distal end 15 of the longitudinal food passage port 14. Such air emission is produced by the effects of heated air buoyancy in combination with a pressure differential within the baking case induced by the oven's blower fan. Simultaneously with such heated air emission, cool ambient air tends to aspirate through the food passage port 14 at its proximal or rearward end 13, such influx of cool air being vacuum drawn by the oven case's blower induced lateral pressure differential. Longitudinally directed flows of air emitting from openings 49 of the proximal air jet submatrix 44 advantageously oppose and reduce or nullify such undesirable aspiration of ambient room temperature air. Simultaneously, air flows directed by the inwardly facing openings 47 of the distal submatrix of air jets 46 oppose outward flows of heated air at the outer end 15 of food passage port 14.

The upper finger duct half 32 of the oven's longitudinal-most vertical pair of finger ducts 32,40 preferably incorporates proximal and distal submatrixes of air jets (not depicted within views) which are configured to vertically mirror the underlying submatrixes 44 and 46.

In the preferred embodiment, the oppositely longitudinal-most vertical pair of finger ducts 26,34 similarly incorporates proximal and distal air jet submatrixes which longitudinally mirror those of the longitudinal-most vertical pair of finger ducts 32,40. In such mirroring configuration, the oppositely longitudinal-most jet matrixes include a distal submatrix 50 having longitudinally facing openings 51, such openings being configured as louvers which are wholly formed with register plate 48. Other air jet submatrixes of finger ducts 26 and 34 (not depicted within views) may similarly be mirroringly configured. The mirroringly configured proximal and distal air jet submatrixes of finger ducts 26 and 34 may operatively oppose outward and inward flows of air at the oven's oppositely longitudinal food passage port in a manner similar to the operation of submatrixes 44 and 46.

In the example of FIGS. 1-4, each air jet of the depicted air jet matrixes 44, 46, and 50 is of the louver type, such air jets being economically and conveniently formed via operation of a punch and die press. The preferably vertically oriented air jets 58 and 54 of the intermediate pairs of finger ducts 30,38 and 20,36, are similarly advantageously formed via operation of punch and die press.

Figure 5:
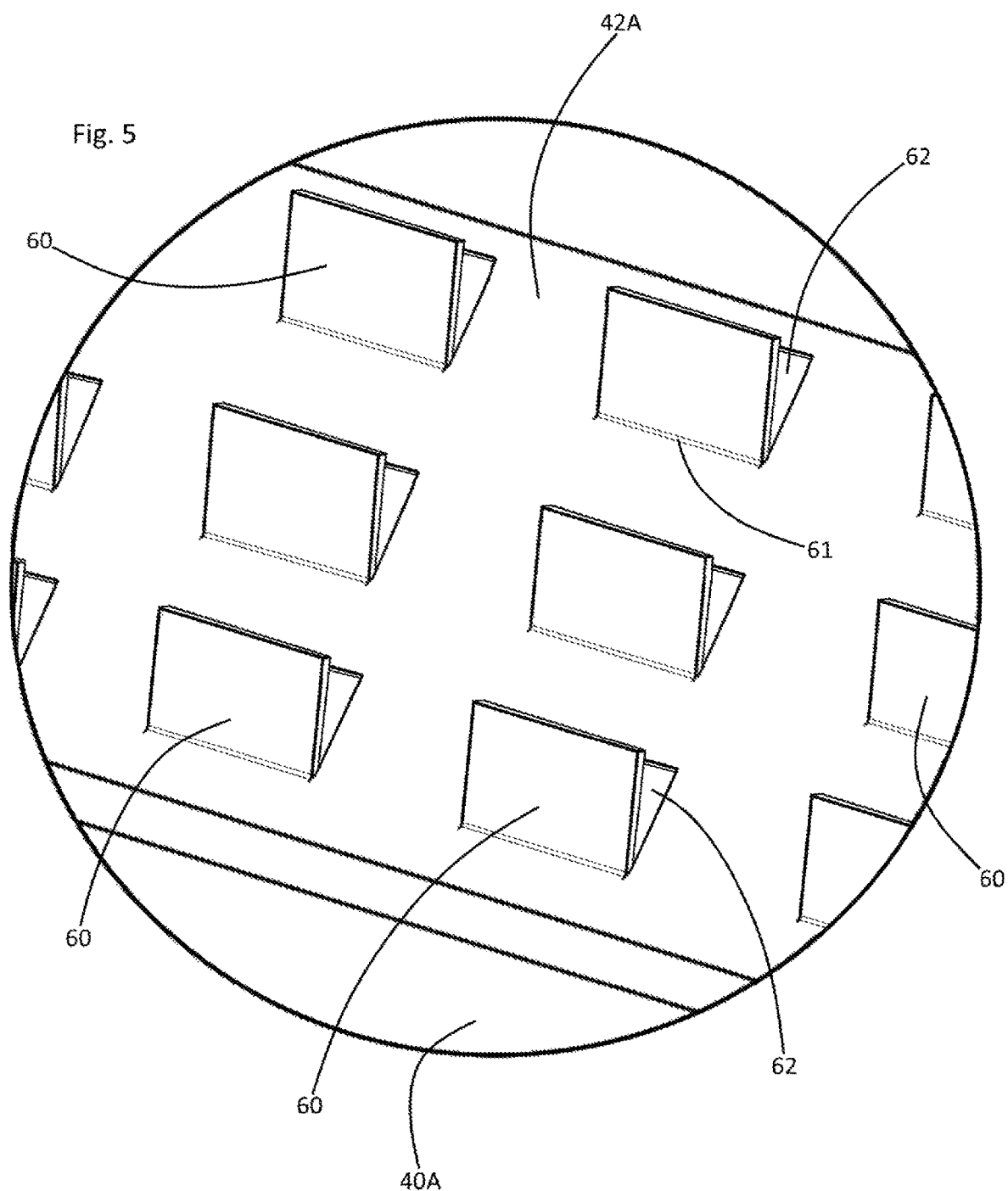
FIG. 5 presents and alternate configuration of the structure of FIG. 3.
Figure 6:
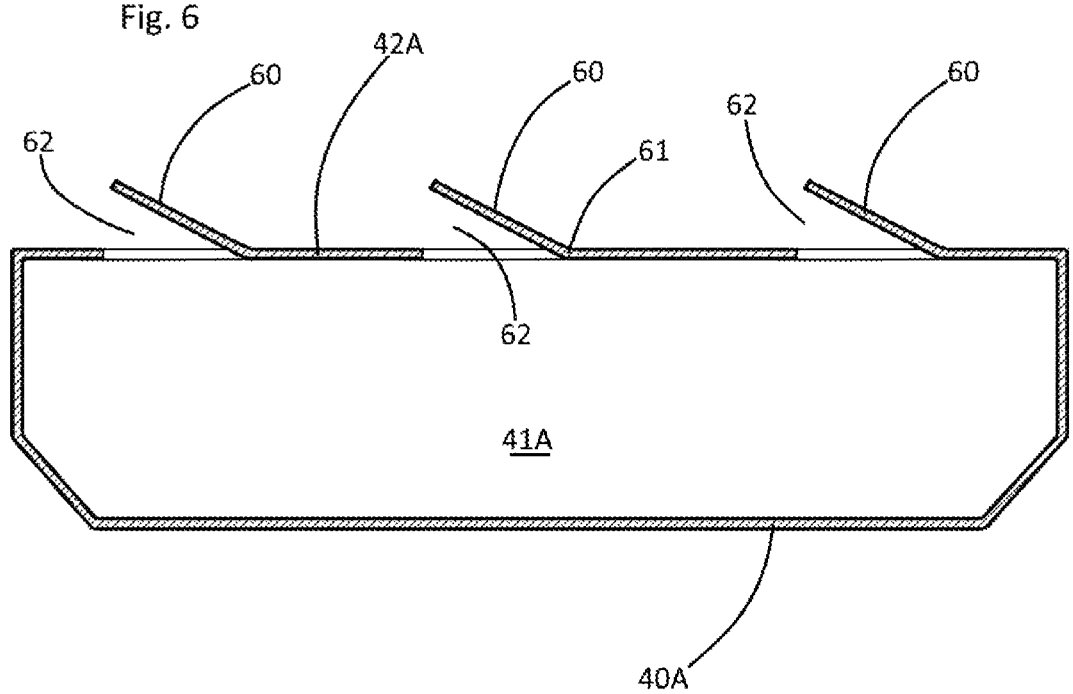
FIG. 6 presents an alternate configuration of the structure of FIG. 4.

Referring simultaneously to FIGS. 1-6, all structures identified by a reference numeral having the suffix "A" appearing in FIGS. 5 and 6 are configured substantially identically with similarly numbered structures appearing in FIGS. 1-4. In the structural alternative of FIGS. 5 and 6, matrixes of "C" shaped cuts are extended through register plate 42A for the creation of air outlet ports 62. The "C" configurations of such cuts assure that ports 62 are closely associated with and controlled by angled air vanes 60. Adjustment of the angles of air vanes 60 at bends 61 may effectively control, adjust, and modify the flow direction of air emitting from ports 62. The air vane adapted ports 62 of the FIGS. 5 and 6 alternative may suitably be utilized in lieu of the louvered ports 46,47 of the FIGS. 1-4 alternative.

Referring simultaneously to FIGS. 1-4, 7, and 8, each structure identified by a reference numeral having the suffix "B" is configured substantially identically with similarly numbered structures appearing FIGS. 1-4. In the FIGS. 7 and 8 structural alternative, hemispherical or semi-spherical nozzle protuberances 64 are formed via punch and die press operation as an integral or wholly formed part of the register plate 42B.

Figure 7:
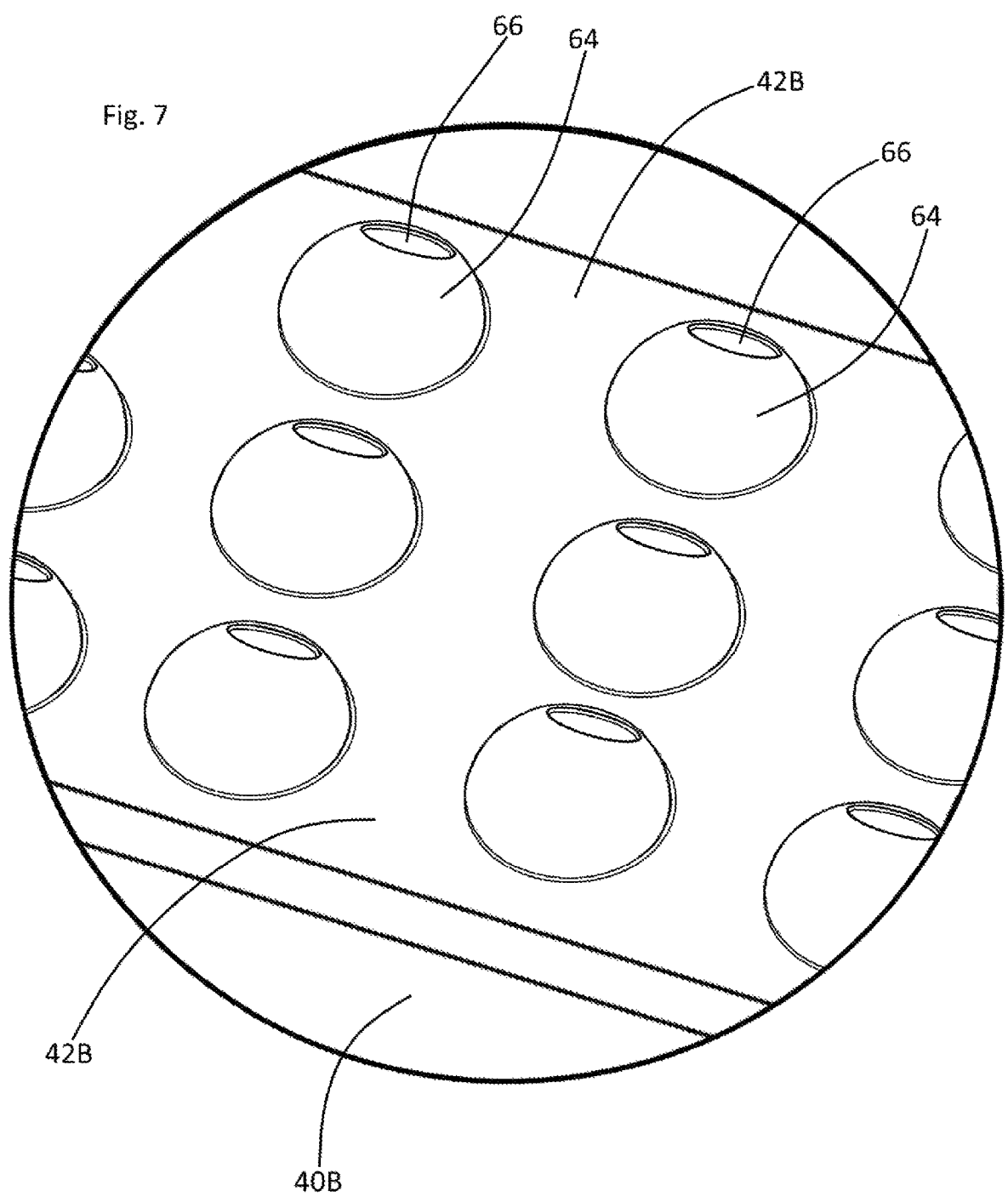
FIG. 7 presents a further alternate configuration of the structure of FIG. 3.
Figure 8:
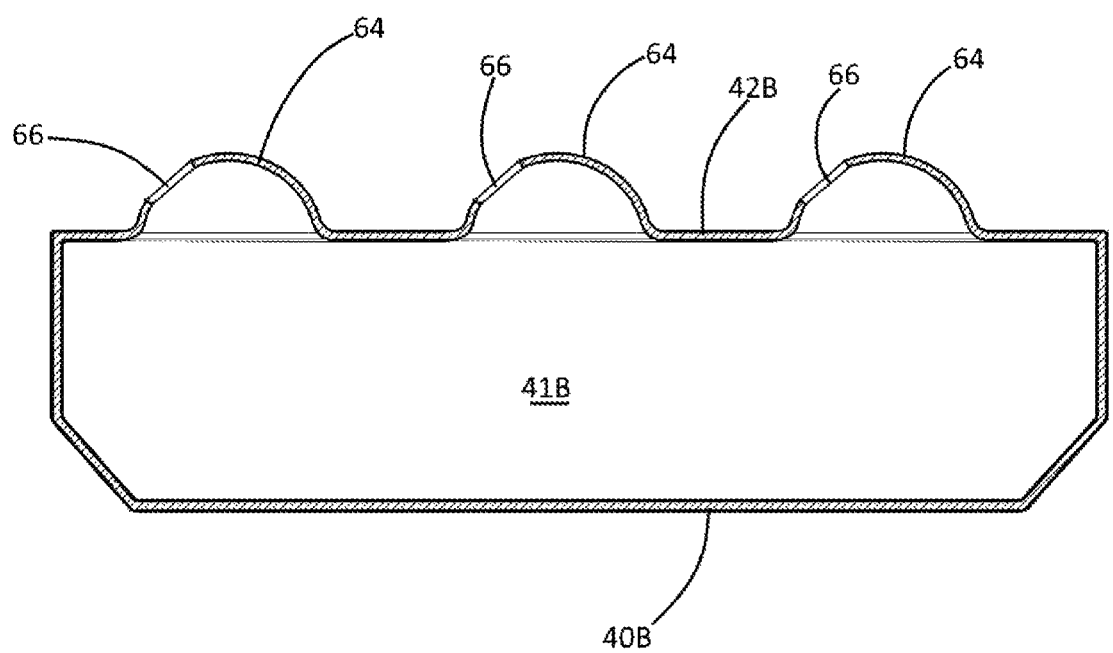
FIG. 8 presents a further alternate configuration of the structure of FIG. 4.

Nozzle ports 66 may be preliminarily cut within register plate 42B, such ports being arranged "off center" with respect to the punch which forms protuberances 64 in order to produce a desired nozzle angle. The angled port nozzle air jet configuration of FIGS. 7 and 8 is considered to constitute a further suitable alternative to the louver configured air jets of FIGS. 1-4.

Figure 9:
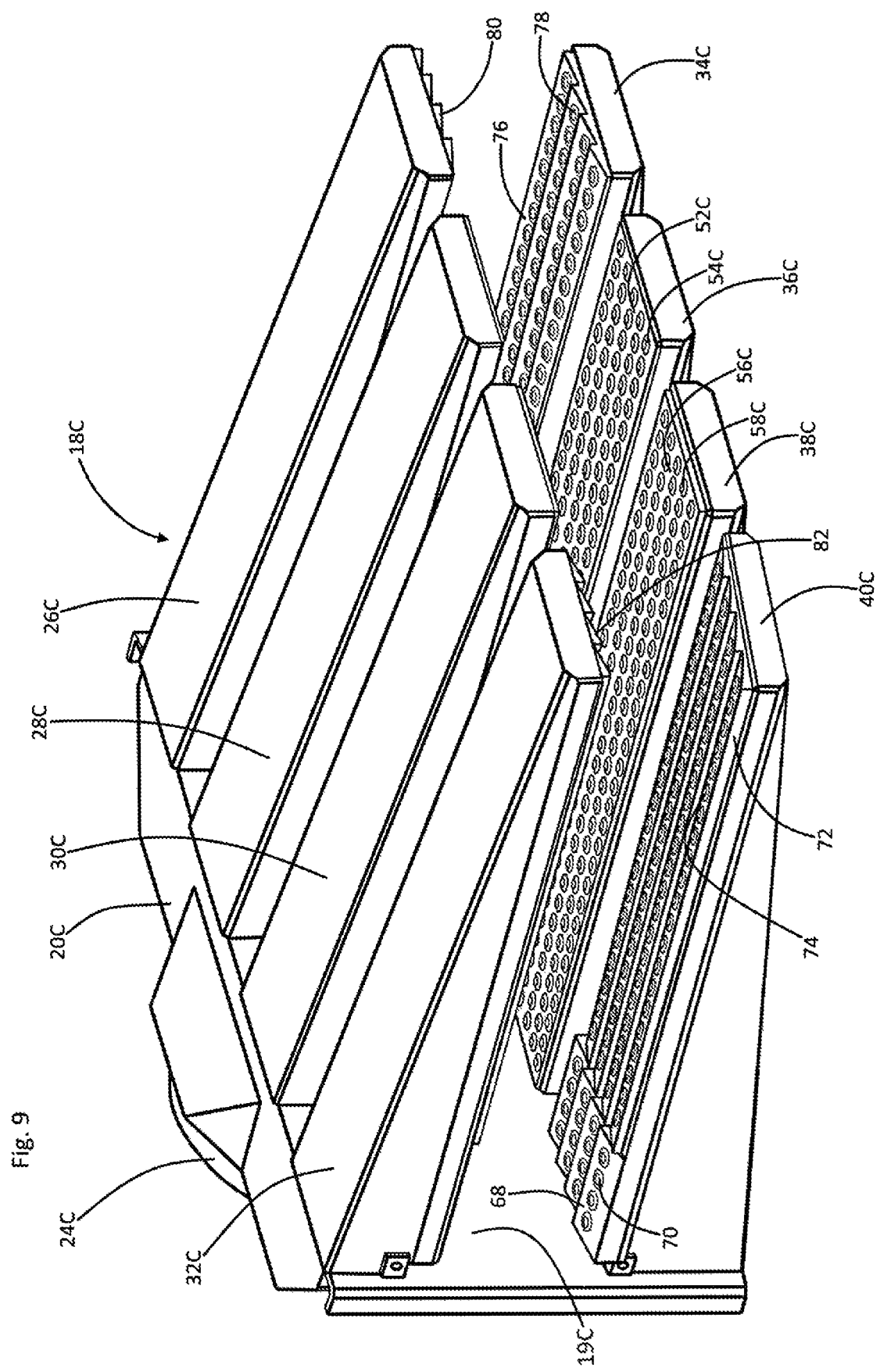
FIG. 9 presents an alternate configuration of the structure of FIG. 2.

Referring simultaneously to FIGS. 1-4 and 9, each structure identified by a reference numeral having the suffix "C" is configured substantially identically with similarly numbered structures appearing in FIGS. 1-4. In the FIG. 9 structural alternative, air jet matrixes 70, 74, and 78, are configured similarly with vertical air jet matrixes 58C and 54C. However, in the FIG. 9 alternative, the register plates which cover and close finger ducts 32C, 40C, 26C, and 34C are specially adapted to present angled lands or bases exemplified by angled tiers 68, 72, 80, and 82. Proximal register plate tiers 68 are angled away from the oven's midline 100, while distal register plate tiers exemplified by tiers 72, 76, 80, and 82 are angled toward midline 100. Such register plate tier angles advantageously bias the flow directions of proximal air jet matrix 70 and distal air jet matrixes 74 and 78 to effect air flow correcting inward and outward flows of impingement air similar to those described above in relation to FIGS. 1-4. The angled base or angled tier nozzle configuration of air jets exemplified by FIG. 9 is considered to be a further suitable alternative to the louvered air jets of FIGS. 1-4.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An air impingement conveyor oven comprising: (a) a baking case having a longitudinal wall, an oppositely longitudinal wall, a front wall, and a rear wall, the baking case being opened by longitudinal and oppositely longitudinal food passage ports respectively positioned at the longitudinal and oppositely longitudinal ends of the baking case, each such port having a proximal end and a distal end; (b) an air plenum having an air intake end and a multiply ported air output end, said plenum being mounted within the baking case; (c) a longitudinal-most finger duct having a proximal air intake end mounted in communication with one of the air plenum's output end ports; (d) intermediate finger ducts having proximal air intake ends mounted in communication with other ports among the air plenum's output end ports; (e) a continuous loop food conveyor extending through the baking case, said conveyor having longitudinal and oppositely longitudinal ends respectively communicating with the longitudinal and oppositely longitudinal food passage ports; (f) a plurality of register plates, each register plate closing one of the finger ducts; and (g) a longitudinal matrix of impingement air jets, said air jet matrix opening the longitudinal-most finger duct at said duct's register plate, wherein each of said matrixes' impingement air jets comprises an air outlet, wherein the longitudinal matrix of impingement air jets comprises a proximal air jet submatrix and a distal air jet submatrix, wherein each air jet among the proximal air jet submatrix has an outlet opening facing the proximal end of the longitudinal food passage port, and wherein each air jet among the distal air jet submatrix has an outlet opening facing away from the distal end of the longitudinal food passage port.

2. The air impingement conveyor oven of claim 1 wherein each air jet has a configuration selected from the group consisting of louvered air jets, air vane adapted ports, angled port nozzles, and angled base nozzles.

3. The air impingement conveyor oven of claim 2 further comprising oppositely longitudinal matrix of impingement air jets having proximal and distal air jet submatrixes, said air jet submatrixes being respectively configured for directing air toward and away from proximal and distal ends of the oppositely longitudinal food passage port.

4. The air impingement conveyor oven of claim 3 wherein air outlets of impingement air jet matrixes opening the intermediate finger ducts are adapted for vertically directing other flows of impingement air.

* * * * *